US006144510A

United States Patent [19]
Neil et al.

[11] Patent Number: 6,144,510
[45] Date of Patent: Nov. 7, 2000

[54] THERMAL COMPENSATION SYSTEM FOR LENS FOCUS ADJUSTMENT

[75] Inventors: Iain A. Neil, Calabasas; Albert K. Saiki, Los Angeles; Rick T. Ishioka, Culver City, all of Calif.

[73] Assignee: Panavision, Inc., Woodland Hills, Calif.

[21] Appl. No.: 09/383,183

[22] Filed: Aug. 25, 1999

[51] Int. Cl.[7] ............................. G02B 7/02; G02B 15/22
[52] U.S. Cl. ..................... 359/820; 359/822; 359/823; 359/705
[58] Field of Search ................................. 359/820, 822, 359/823, 705

[56] References Cited

U.S. PATENT DOCUMENTS 6,040,950  3/2000  Broome .................................. 359/820

FOREIGN PATENT DOCUMENTS 64-66088  3/1989  Japan ............................. B23K 26/04

*Primary Examiner*—Georgia Epps
*Assistant Examiner*—Saeed Seyrafi
*Attorney, Agent, or Firm*—Lyon & Lyon LLP

[57] ABSTRACT

A thermal compensation system for an optical lens that has a focus adjustment with visible focus distance numerals and a juxtaposed index line for identifying the focus distance. The index line is provided on an internal ring slidably mounted to rotate circumferentially with respect to a barrel portion of the optical lens that includes the focus distance numerals. An actuator mounted within the optical lens includes a wax motor that is responsive to temperature changes and mechanical lever that engages both the wax motor and the ring for causing circumferential movement of a ring in response to actuation movement of the wax motor as caused by temperature changes. Further, an adjustment cam is provided for adjusting the relative positions of the wax motor and lever for calibrating the temperature responsive movements of the ring bearing the index line.

15 Claims, 7 Drawing Sheets

THERMAL COMPENSATION SYSTEM FOR LENS FOCUS ADJUSTMENT

This invention relates to optical lens systems, such as for cameras, that have manual focus adjustments and, in particular, to a system for compensating for temperature changes that change the lens focus distance.

Conventional objective lenses for cameras include a focus adjustment, usually by rotating a portion of the lens or a ring, and the outer surface of the lens includes numerals indicating the distance at which the lens is focused when a particular numeral is aligned with an index line, on an adjacent portion of the lens. In other words, the relative movement between the distance numerals and the index line changes the focus of the lens and the distance of the focus at a particular adjustment is indicated by the distance numeral opposite the index line. The focusing adjustment on the exterior of a lens causes lens elements internally of the lens to move along the optical axis for changing the distance at which the lens is focused, which lens elements may comprise one or more groups of lenses moving in one or both axial directions. As the ambient temperature changes, the lens body and internal components expand and contract which causes the distance at which the lens is in precise focus to change without changing the focus setting. For example, at room temperature, an object at a fixed distance may be in focus when the lens is set to the proper focus marking for that distance, which can be measured, but the object is no longer in focus at a higher or lower temperature. To keep the object in focus, when the ambient temperature changes substantially and the lens reaches the new ambient temperature, the numerical focus marking must be set to a higher or lower number than used previously to obtain the proper focus, which focus may or may not be readily verifiable by viewing through the lens. This shift in focus due to temperature changes may be a combination of thermal expansion and performance changes of the optics.

Several conventional methods have been used to compensate for this focus shift caused by temperature changes, including both passive and active methods which utilize electronic sensors, different thermal expansion rates of different metals, thermometers, and moving focus scale rings. In particular, such sophisticated mechanisms and methods have been used for objective lenses used for motion picture cameras because of the substantial ambient temperature changes that may occur during the entire day and night that outdoor filming is taking place. Moreover, any temperature compensation mechanism or method must respond to the actual changes in focus distance caused by temperature changes of the lens, not merely in response to the ambient temperature change, because large film camera lenses, such as zoom lenses, require a significant period of time to reach a complete change in temperature internally even though the ambient temperature changes significantly and rapidly.

Thus, it is an object of the present invention to provide a reliable system for compensating for focus distance changes caused by temperature changes by providing a movable index line for the focus distance numerals, which index line moves in response to temperature changes of the lens.

Another object of this invention is to provide such a temperature compensation system for an optical lens wherein a movable index line is moved relative to the focus adjustment in responses to temperature changes in the lens whereby the focus adjustment of the lens may be corrected by resetting the proper focus distance numeral opposite the movable index line.

A further object of the present invention is to provide a passive thermal compensation system for the focus adjustment of an optical lens wherein a wax motor is provided in the lens and causes circumferential movement of a ring bearing the focus index line as ambient temperature changes cause extension and retraction of the piston of the wax motor. A still further object is to provide such a temperature compensation system wherein the mounting position of the wax motor is adjustable for calibrating the movements of the focus index line to actual changes in the focus distance caused by particular temperature changes.

Other and more detailed objects and advantages will appear from the following description and the accompanying drawings, wherein.

Figure 1:
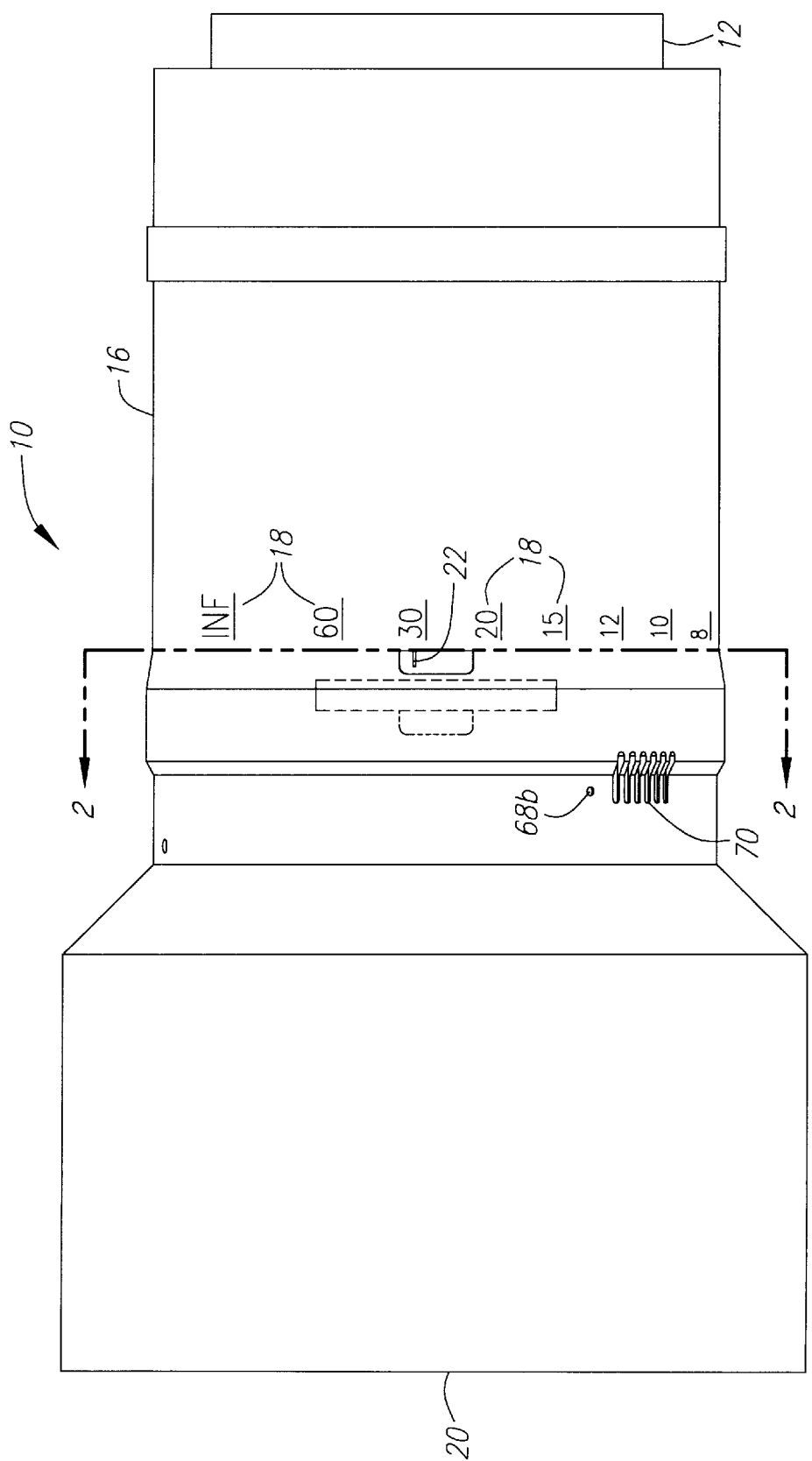
FIG. 1 is a diagrammatic illustration of a typical objective lens for a movie camera with the exterior of the focus adjustment thermal compensation system of the present invention also illustrated.

Referring now to FIG. 1, a typical camera lens 10 is diagrammatically illustrated with a camera mount 12 on one end for mounting the lens to the camera in a conventional manner. The lens 10 includes a collar 14 and a barrel 16 that are rotatable relative to each other for focusing the lens 10 in a conventional manner. The barrel 16 includes focus distance numerals 18 on the exterior of the barrel 16 for indicating the distance to an object beyond the front 20 of the lens 10 that is in focus with that setting of the focus distance numeral opposite an index line 22 that is normally provided on the collar 14 but is repositioned in the system of the present invention. In other words, as shown in FIG. 1, the focus distance numerals "8" through "INF" indicate the focus distance from the front 20 of the lens 10 to an object at eight feet to infinity when the collar 14 and barrel 16 are rotated relative to each other to bring the index line 22 in line with one of those numerals. For example, as shown in FIG. 1, the focus distance of lens 10 would be slightly more than 30 feet as shown by the index line 22 being slightly above the numeral "30". As thus far described, the optical lens 10 is conventional and may be of any conventional type including prime lenses without adjustments other than the focus adjustment and zoom lenses that include focal length adjustments. Moreover, as will appear to those skilled in the art, the present invention is also applicable to lenses for uses with other than movie cameras that require thermal compensation for focus distance markings.

Figure 2:
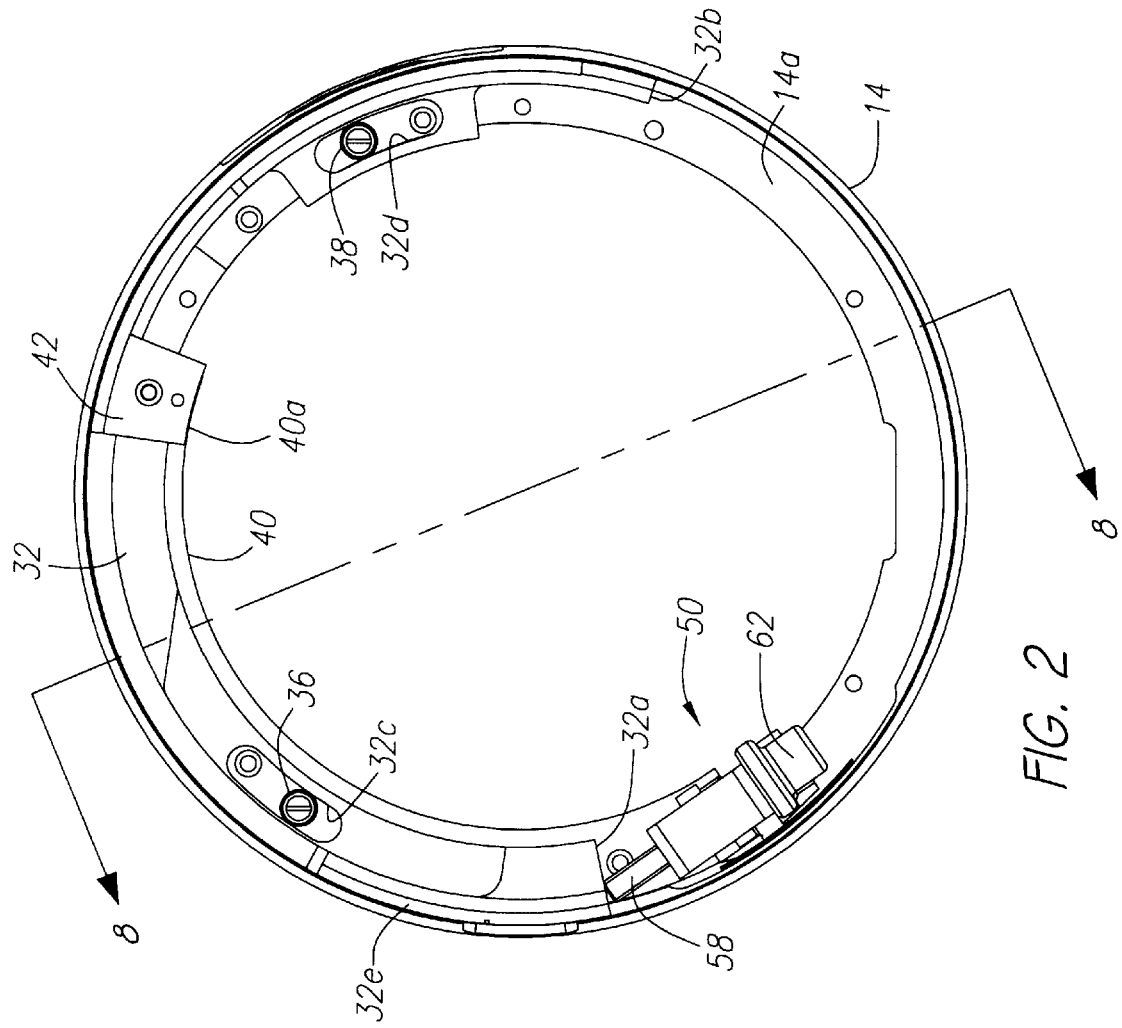
FIG. 2 is a sectional view taken substantially on line 2—2 of FIG. 1 with the optical elements omitted for more clearly illustrating the temperature compensation system of the present invention.
Figure 3:
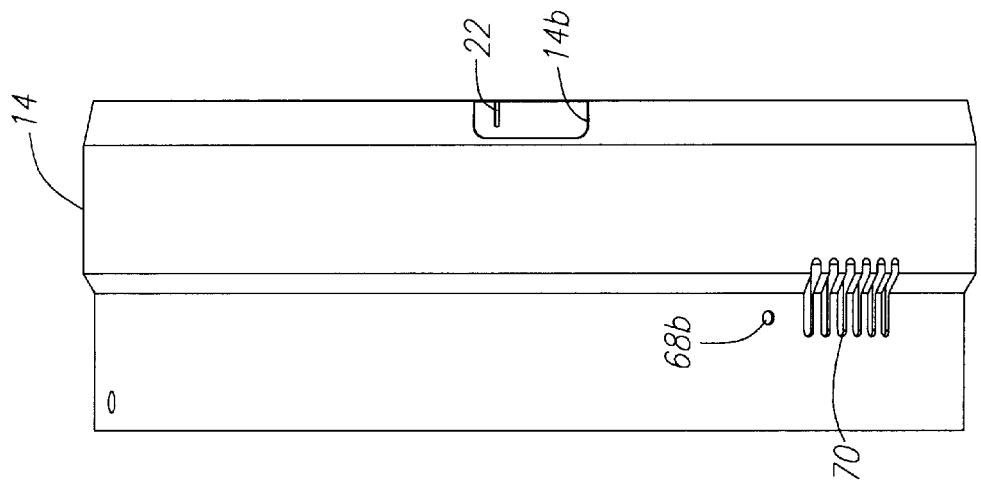
FIG. 3 is an elevation view of the portion of the lens that includes the temperature compensation system of this invention.
Figure 4:
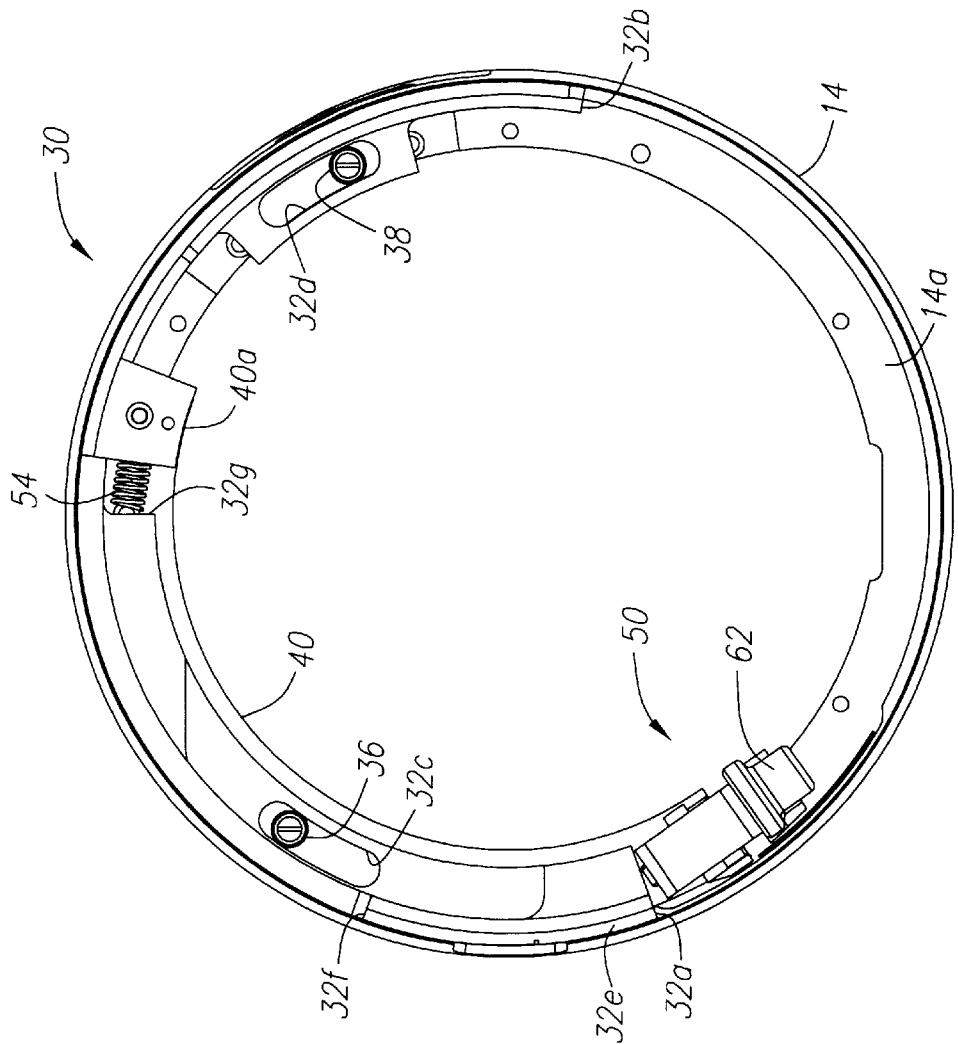
FIG. 4 is a view similar to FIG. 2 but showing the temperature compensation system of the present invention in a different position, as caused by a temperature change.
Figure 5:
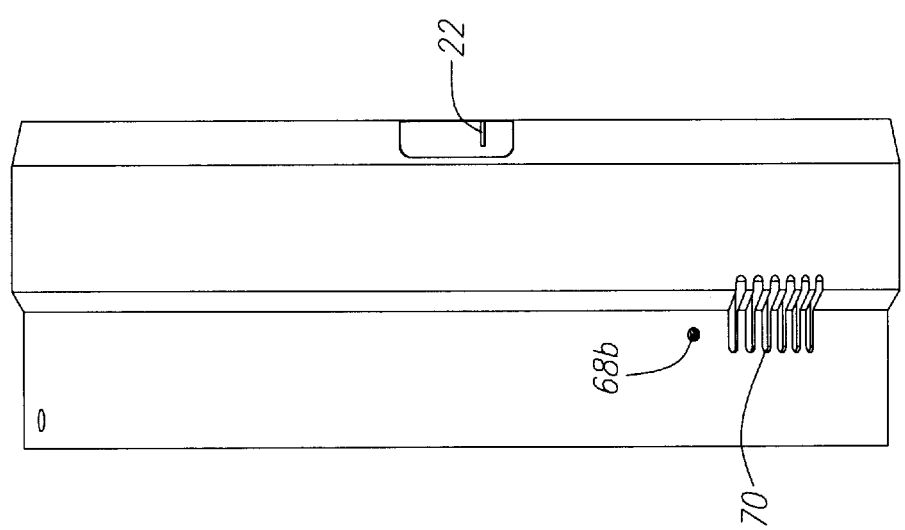
FIG. 5 is an elevation view similar to FIG. 3 but showing the index line in a different position corresponding to the change in position shown in FIG. 4 caused by a temperature change.
Figure 7:
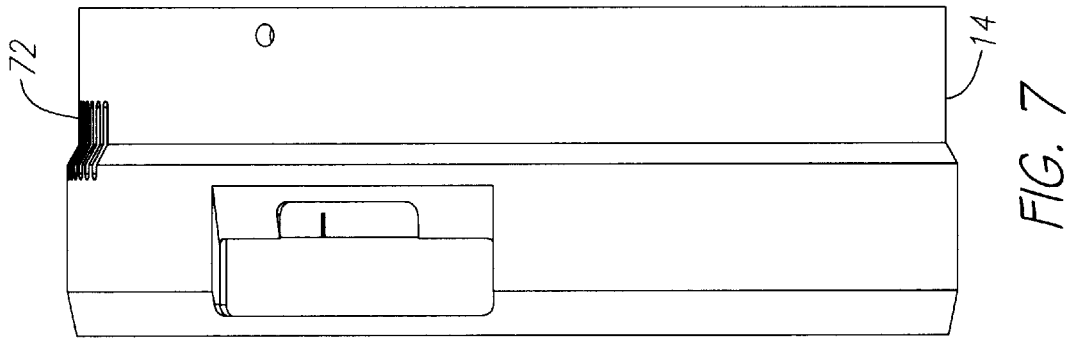
FIGS. 6 and 7 are elevation views of the exterior of the thermal compensation system from the opposite side of the lens that is shown in FIGS. 3 and 5.
Figure 6:
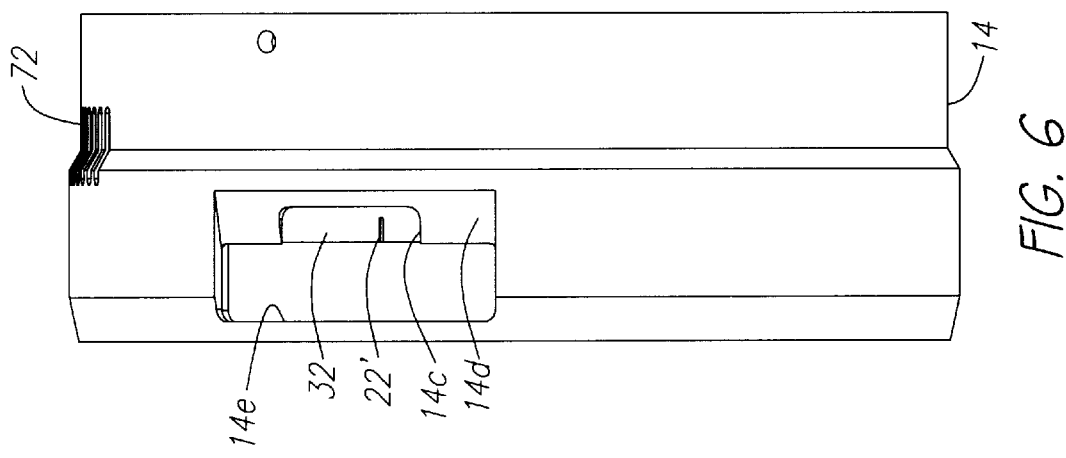
Figure 8:
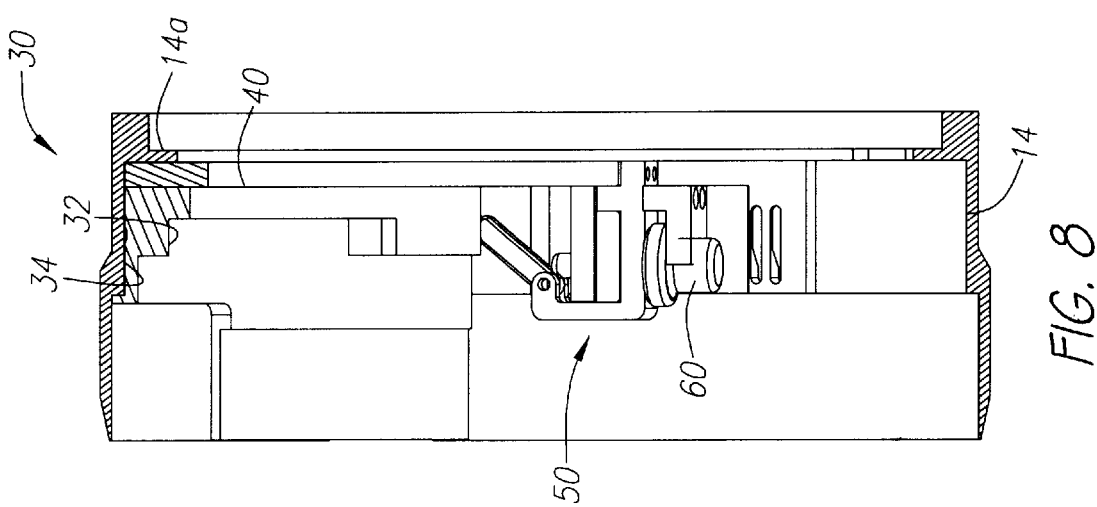
FIG. 8 is a sectional view taken substantially on the line 8—8 in FIG. 2 for illustrating the thermal compensation system of this invention.
Figure 10:
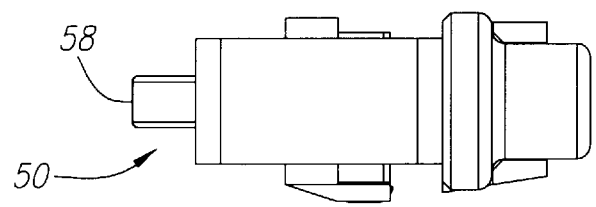
FIGS. 9, 10, 11, 12 and 13 are side, top, bottom, front and rear views, respectively, of the actuator of the thermal compensation system of this invention in an adjusted position for causing maximum movement of the index line.
Figure 12:
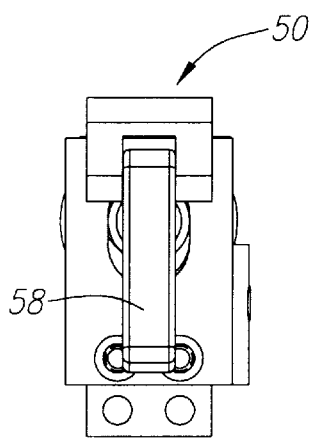

Referring now to FIGS. 2–8, the collar 14 of the objective lens 10 and the components mounted therein that comprise the temperature compensation system, generally designated 30, of the present invention are shown separate from the remaining elements of the objective lens 10 for clarity of illustration. Referring more particularly to FIGS. 2, 4 and 8, the temperature compensation system 30 is mounted in collar 14 and includes a movable ring 32 slidably mounted on an internal cylindrical surface 34 in collar 14. Preferably the ring 32 extends more than 180 degrees but less than 360 degrees between its ends 32a and 32b. A pair of guide bearings 36 and 38 extend axially and are mounted, directly or indirectly, on a flange portion 14a of collar 14. The ring 32 is provided with a pair of slots 32c and 32d that the bearings 36 and 38, respectively, fit into for guiding the circumferential movement of the ring 32. An arcuate mounting member 40 supports a portion of ring 32 in the axial direction and includes an axially extending end portion 40a that also supports the ring 32 in the radially inward direction. A retainer tab 42 is mounted on top of end portion 40a for capturing the ring 32. The ring 32 also includes an axially extending portion 32e at one end that extends circumferentially from end 32a to an end 32f of that axially extending portion, which portion 32e includes on its exterior surface the index line 22 for setting the focus distance with the focus distance numerals 18. The index line 22 is visible through a cut-out portion 14b in the collar 14. On the opposite side of collar 14 from cut-out portion 14b, there is provided a similar cut-out portion 14c on an inclined surface 14d for observing a second index line 22' on the ring 32. Collar 14 is also provided with a large opening 14e adjacent the cut-out 14c and inclined surface 14d for observing a second set of focus distance numerals (not shown) on an underlying portion of barrel 16 of the lens 10. With this arrangement, there are focus distance numerals 18 and a focus index line 22, 22' on opposite sides of the lens 10 which allows convenient focus adjustment by the cameraman from either side of the lens. By circumferential movement of the ring 32, the index lines 22, 22' move circumferentially with respect to the focus distance numerals 18 and therefore the apparent focus distance is changed by that amount of movement. Conversely, when the correct focus distance is established by setting the proper focus distance numeral 18 at the index line 22, 22', as shown in FIGS. 3 and 6 and then the ring 32 is moved circumferentially to reposition the index line 22, 22' in the location shown in FIGS. 5 and 7, the barrel 16 of the lens must be rotated to match the correct focus distance numeral with the new locations of the index lines 22, 22' thereby actually readjusting the axial position of the internal focus lenses which, at the same temperature, would change the actual focus distance. By the present invention, the circumferential location of the index lines 22, 22' are varied in response to temperature changes such that if the correct focus distance numeral 18 is positioned in alignment with the index lines 22, 22', then the optical lens 10 is focused at the same distance under the varying temperature conditions, which distance is indicated by the focus distance numeral.

Referring more particularly to FIGS. 2, 4 and 8, an actuator, generally designated 50, is mounted on the inside of collar 14 for causing the circumferential movement of ring 32 in response to changes in the temperature of the lens 10 in response to changes in ambient temperature. The details of the construction of actuator 50 will be described below but as a general description it should be noted that the actuator 50 includes a temperature responsive wax motor 62 that has an element that extends and retracts in the circumferential direction whereby an element of the actuator 50 engages the end 32a of ring 32 and causes circumferential movement of ring 32 corresponding to temperature changes. A compression spring 54 (see FIG. 4) is mounted in the axially extending end portion 40a of arcuate mounting member 40 and spring 54 engages an abutment 32g on ring 32 for continually and resiliently forcing the ring 32 in one circumferential direction, namely, the counterclockwise direction as shown in FIGS. 2 and 4. Thus, the compression spring 54 causes the end 32a of ring 32 to remain in continual engagement with the actuator 50 for the movement of ring 32 to respond precisely to movements of the actuator 50 caused by temperature changes. The actuator 50 is mounted on the arcuate mounting member 40 that is in turn affixed to the flange 14a on the collar 14. Since both the actuator 50 and the compression spring 54 are mounted on opposite ends of the arcuate mounting member 40, in effect a portion of the ring 32 is captured between the two ends of the arcuate mounting member 40 for controlling the circumferential movement of the ring 32.

Referring now to FIGS. 9–16, there are various views of the actuator 50 in various conditions and separated from the other components of the temperature compensation system 30 for clarity of illustration. A pivot housing 56 has a pair of spaced holes 56a for receiving machine screws to mount the pivot housing 56 on the end of arcuate mounting member 40. The opposite end of pivot housing 56 includes a forked pivot support 56b on which is pivotally mounted a lever 58 by a pin 60. The wax motor 62 has a cylinder portion 62a extending through a hole 56c in the pivot housing 56, which hole 56a is elongated in the vertical direction along the pivot housing 56 to allow movement of the wax motor 62 therealong. A fork shaped cap 64 supports a rear cylindrical portion 62b of the wax motor 62 in a manner to allow the aforesaid movement of the wax motor 62 along the pivot housing 56. The cap 64 is mounted on the pivot housing 56 by a pair of machine screws 64A extending through holes 64b in cap 64 to engage threaded holes 56d in the pivot housing 56. A retainer 66 is mounted on pivot housing 56 by a machine screw 66a extending through a hole 66b in retainer 66 and engaging the threaded hole 56e on the pivot housing 56. Retainer 66 has an oval hole 66c corresponding to the oval hole 56c in pivot housing 56 for the cylindrical portion 62a of the wax motor 62 to extend through and be guided in the vertical movement of the wax motor. An adjustment cam 68 is movably captured between the pivot housing 56 and the retainer 66 in the assembled condition. Adjustment cam 68 has an oval hole 68a therethrough that is inclined relative to the oval holes 56c and 66c but also fits the cylindrical portion 62a of the wax motor 62. The position of adjustment cam 68 can be adjusted laterally by a machine screw 68b (see FIGS. 1, 3 and 5) that engages the threaded hole 68c of the adjustment cam 68 from the exterior of the lens 10. The wax motor 62 has a piston 62c that extends axially from the cylindrical portion 62a of the wax motor 62 and piston 62c extends and retracts in response to temperature increases and decreases, respectively, by reason of the expansion and contraction of the fluid material in the wax motor 62. A typical wax motor that performs this function satisfactorily is a model CT5132-00 Thermal Actuator available from Caltherm Corporation, Michigan, U.S.A., although other types of thermally responsive devices from other sources may be used.

In the assembled condition of the actuator 50, as shown in FIGS. 9–15, the piston 62c of the wax motor 62 engages the lever 58 and therefore the extension and retraction of the piston 62c causes a comparable pivoting of the lever 58. With the actuator 50 mounted on the arcuate mounting member 40 within collar 14, as described above, the lever 58 engages the end 32a of ring 32 and therefore the pivoting movement of lever 58 causes circumferential movement of ring 32 which is resiliently opposed by the compression screen 54. Thus, the temperature responsive wax motor 62 causes temperature related proportional movement of the ring 32, whereby the index lines 22, 22' are circumferentially moved proportional to the temperature of the lens 10. This permits the focus adjustment of the lens 10 by relative rotation of the collar 14 and the barrel 16 to align the proper focus distance numeral 18 with the index line 22, 22' as the temperature of the lens 10 changes.

As shown in FIGS. 3 and 6, for example, the collar 14 is provided with vent slots 70 and 72 on opposite sides of the collar 14 to allow ambient air to circulate through the collar portion of the optical lens 10 and past the actuator 50 for exposing the wax motor 62 inside of the lens 10 to the same ambient temperature to which the exterior of the lens 10 is exposed. This is particularly important when the lens 10 includes a large lens element at the front 20 that is part of the focus lens system because such lens element is exposed directly to the ambient temperature and will more quickly assume that temperature than lens elements within the body of the optical lens 10.

Figure 9:
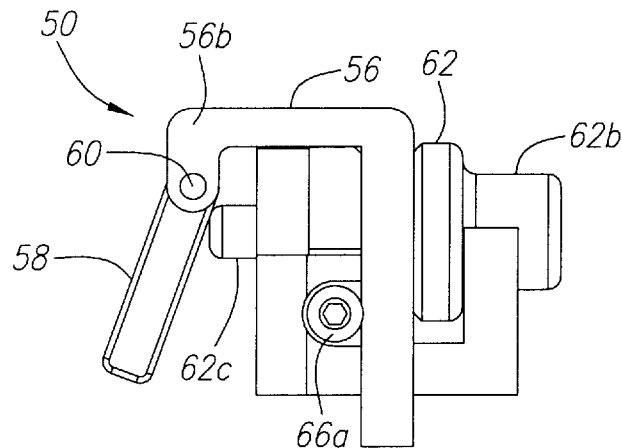
Figure 13:
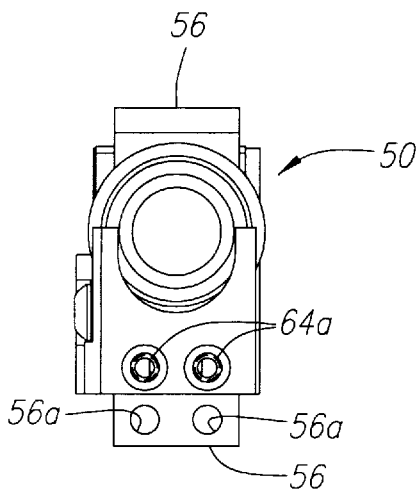
Figure 11:
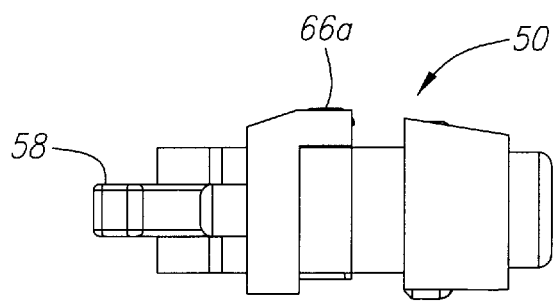
Figure 15:
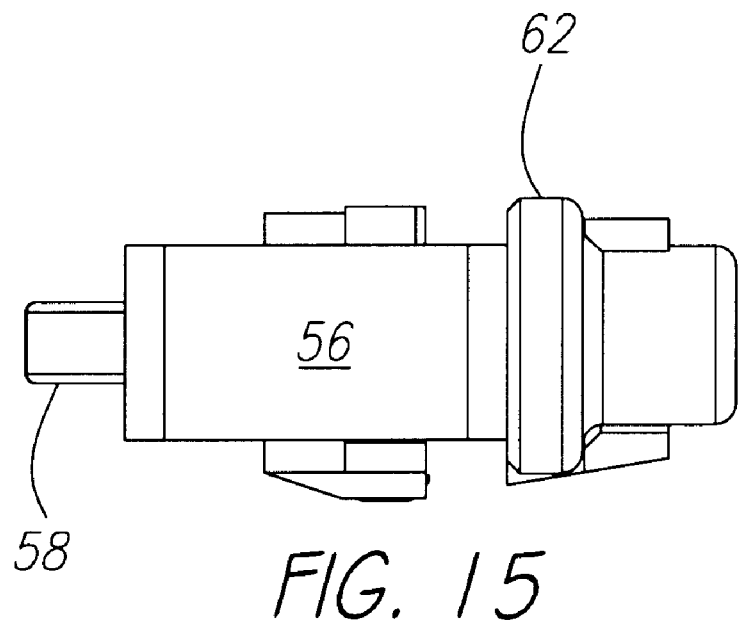
FIGS. 14 and 15 are side and top views, respectively, of the actuator similar to FIGS. 9 and 10 but showing the actuator in an adjusted position for causing the minimum movement of the index line.
Figure 14:
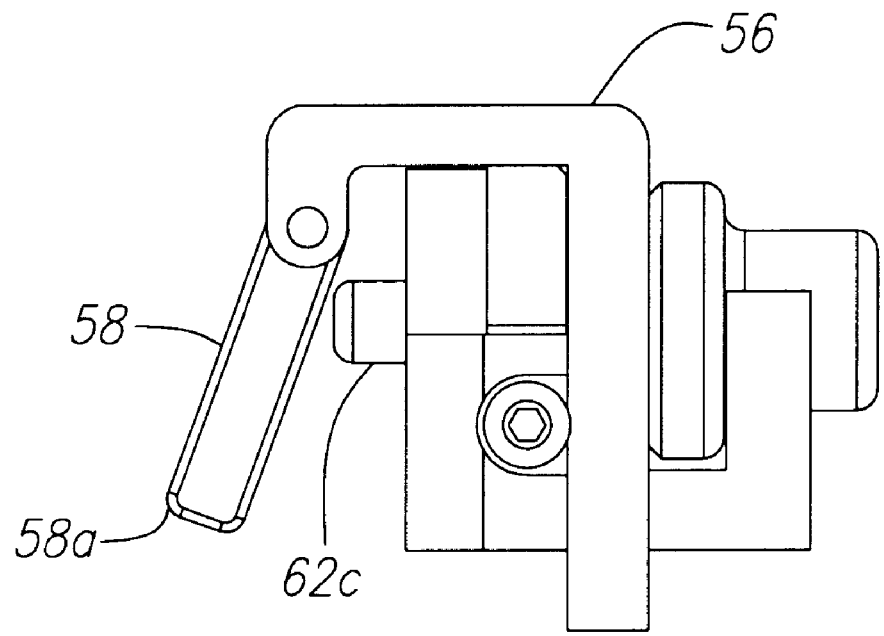
Figure 16:
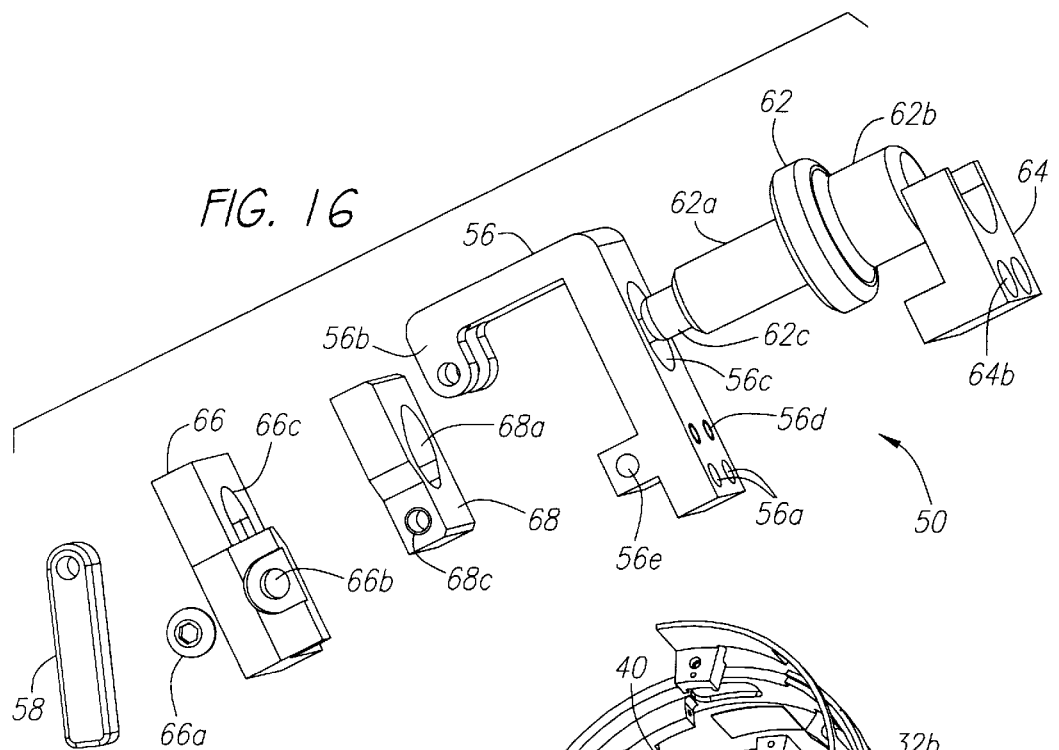
FIG. 16 is an exploded view of the actuator shown in FIGS. 9–15.
Figure 17:
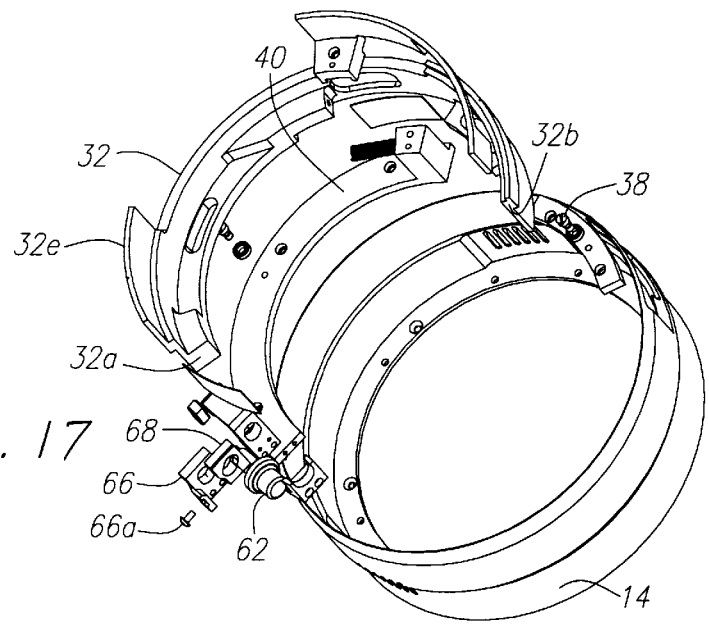
FIG. 17 is an exploded view of the components of the thermal compensation system of the present invention.
Figure 18A:
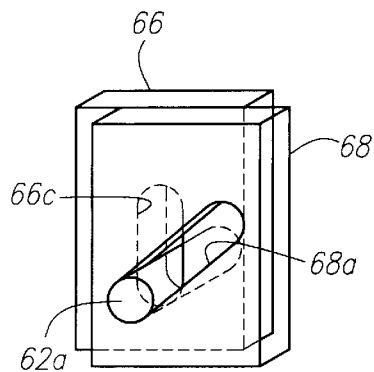
FIGS. 18A, 18B and 18C are diagrammatic views of the adjustment mechanism for a calibration adjustment of the position of the wax motor of the actuator.
Figure 18B:
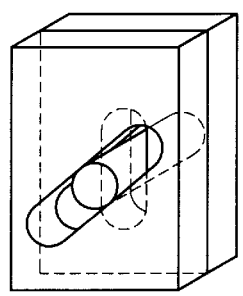
Figure 18C:
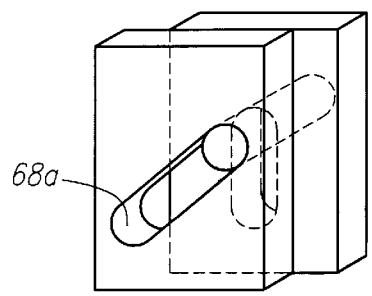

While an actuator 50 with a wax motor 62 mounted in a fixed position can be designed to satisfactorily provide temperature compensation results by the proper selection of the wax motor 62, selection of the appropriate length for the lever 58, selection of the optimum point of contact between the piston 62c and the lever 58, etc., it is preferred that the position of the piston 62c of the motor 62 along the length of the lever 58 be adjustable for precisely calibrating the movement of the ring 32 in response to specific temperature changes and this calibration is accomplished by the adjustment cam 68. FIGS. 18a–18c diagrammatically illustrate the manner in which the adjustment cam 68 cooperates with the retainer 66 for moving the cylindrical portion 62a of the wax motor 62 in a vertical direction. The cylindrical portion 62a extends through both the oval hole 68a in adjustment cam 68 and the oval hole 66c in the retainer 66, but the oval hole 68a is inclined to the vertical hole 66c. By appropriately manipulating the machine screw 68b from the exterior of the optical lens 10, the adjustment cam 68 can be moved laterally from one extreme position to another extreme position, as shown in FIGS. 18a and 18c. Such lateral movement of adjustment cam 68 causes the oval hole 68a to force the cylindrical portion 62a of the wax motor 62 upwardly and downwardly in the vertical hole 66c of the retainer 66, as well as in the vertical hole 56c in the pivot housing 56 which for clarity is not shown in FIGS. 18a–18c. Thus, the point of engagement of the piston 62c on the lever 58 can be varied from the position shown in FIG. 14, comparable to the lowest position shown in FIG. 18a, to an upper position shown in FIG. 9, comparable to the uppermost position shown in FIG. 18c.

By this range of adjustment, the ratio of the movement of the tip end 58a of the lever 58 relative to the piston 62c of the wax motor 62 can be varied from three-to-one to four-to-one. By this calibration adjustment, each optical lens 10 that includes this temperature compensation system 30 can be precisely calibrated to cause the correct amount of movement of the index line 22 relative to the focus distance numerals 18 upon specific temperature changes by placing the optical lens 10 in a controlled temperature environment, such as a refrigerator or oven, until the lens 10 reaches a stable temperature condition, mounting the lens 10 on a camera, visually focusing the lens on an object at a specific distance, and appropriately adjusting the position of the wax motor 62 to adjust the ratio of the movement of piston 62c to the movement of the tip 58a of lever 58 to achieve the correct alignment of the index line 22 and focus distance numeral 18.

By carefully selecting the type of wax motor or other temperature responsive device and appropriately designing the actuating lever arrangement or other motion transmission means, the movement of the ring 32 can accurately mimic the focus shift caused by the temperature changes. Preferably, the wax motor should respond to temperature changes at substantially the same rate as the focus elements of the lens which normally is very slow and over several hours. In other words, even though the ambient temperature may vary substantially over a short period of time, the temperature of the entire lens will not change as rapidly and, therefore, the response of the wax motor to ambient temperature changes should correspond to the lens temperature changes. Preferably the mechanism for converting the movement of the wax motor to a movement of the ring bearing the index line is adjustable and compensates for any difference in the rate of change in the focused distance and the rate of change of the wax motor or other temperature responsive device. By this arrangement, thermal compensation is accomplished without the use of electrical motors for causing the movement or sophisticated controls and temperature sensing devices for causing the correct movement.

Thus, by the present invention, the correct focus distance of an optical lens based on the focus distance numerals on the lens will be achieved at wide ranges of ambient temperatures by reason of the index line on the lens being moved in response to the ambient temperature. Similarly, changes in the actual focus distance as a result of the change in temperature during a day will be readily apparent from noting that the index line has moved with respect to the previously selected focus distance numeral and, therefore, an appropriate readjustment can be made without visually refocusing the lens. While the presently preferred embodiment of this invention has been disclosed as using a specific form of wax motor 62, any type of temperature responsive actuator may be used that reliably responds to changes in temperature. Similarly, although a specific construction of the actuator 50 is disclosed, wherein, for example, a pivoted lever 58 and an adjustment cam 68 are disclosed, it will readily appear to those skilled in the art that other types of motion transmission devices can be substituted for the lever 58 and other types of calibration adjustment mechanisms may be substituted for the adjustment cam 68.

What is claimed:

1. A thermal compensation system for an optical lens having a focus adjustment with visible focus distance numerals and a juxtaposed index line for identifying the present focus distance numeral, comprising:

a movable member having the index line thereon and being movable independent of the focus adjustment, an actuator for causing said movement independent of the focus adjustment in response to temperature changes of the optical lens for moving the index line to compensate for a change in focus adjustment of the optical lens based on the focus distance numerals due to the temperature changes.

2. The thermal compensation system of claim 1, further including a motion transmission device operatively connecting said actuator to said movable member for causing said movement.

3. The thermal compensation system of claim 2, wherein said motion transmission device comprises a pivotally mounted lever engaged by said actuator, said lever also engaging said movable member.

4. The thermal compensation system of claim 1, wherein said actuator includes a wax motor.

5. The thermal compensation system of claim 4, wherein said actuator further includes a pivotally mounted lever engaged by said wax motor, said lever also engaging said movable member.

6. The thermal compensation system of claim 1, wherein said actuator includes a movement adjusting means for varying the magnitude of movement of said movable member caused by said actuator for a specific temperature change.

7. The thermal compensation system of claim 4, wherein said actuator also includes means for adjusting the position of said wax motor for varying the magnitude of movement of said movable member caused by said actuator for a specific temperature change.

8. A thermal compensation system for an optical lens assembly having a rotatable focus adjustment with circumferentially located and visible focus distance numerals, comprising:
   a ring mounted in the optical lens assembly for circumferential movement, said ring having an index line juxtaposed to the focus distance numerals for identifying the present focus distance of the optical lens by the focus distance numeral opposite said index line;
   a wax motor mounted in the optical lens assembly in an orientation for an actuating piston of said wax motor to cause the circumferential movement of the ring, said actuating piston movable in direct response to temperature changes of said wax motor; and
   wherein said ring moves a circumferential amount in response to a temperature change that is substantially equal to the change in focus distance of the optical lens assembly, as represented by the focus distance numerals juxtaposed to the circumferentially moved index line, caused by said temperature change.

9. The thermal compensation system of claim 8, further including a motion transmission device operatively connecting said wax motor to said ring for causing said movement.

10. The thermal compensation system of claim 9, wherein said motion transmission device is adjustable for adjusting the rate of movement of said ring relative to the rate of movement of said actuating piston of said wax motor.

11. The thermal compensation system of claim 8, further including a spring engaging said ring for resiliently opposing the circumferential movement caused by said wax motor.

12. A temperature compensation system for an optical lens assembly having relatively rotatably components for focus adjustment with the focus distance represented by focus distance numerals circumferentially space on the optical lens assembly, comprising;
   a partial ring extending circumferentially and mounted in the optical lens assembly for limited circumferential movement, said ring having an externally visible index line thereon adjacent to the focus distance numerals;
   a wax motor mounted in the optical lens assembly and having a piston movable in direct response to temperature changes of said wax motor;
   a lever pivotal mounted in the optical lens assembly, said lever having an extending end engaging said ring, said wax motor piston engaging an intermediate portion of said lever between said pivotal mounting and said extending end for movement of said piston to cause pivoting of said lever and, in turn, said lever causing said circumferential movement of said ring; and
   an adjustable mounting means supporting said wax motor relative to said lever for adjusting the location of said intermediate portion of said lever engaged by said wax motor piston for calibrating the magnitude of circumferential movement caused by temperature changes of the wax motor to correspond to changes in the focus distance of the optical lens assembly caused by said temperature changes, whereby alignment of a focus distance numeral with said index line produces an image in focus at that distance at any temperature.

13. The thermal compensation system of claim 12, further including a spring engaging said partial ring for resiliently urging said partial ring against said lever.

14. The thermal compensation system of claim 12, wherein said adjustable mounting means includes an adjustment cam and an externally operable adjustment device of removing said adjustment cam.

15. The thermal compensation system of claim 14, wherein said adjustment cam has an oval hole oriented at an angle to and engaging the wax motor.

* * * * *